United States Patent
Buckland et al.

(10) Patent No.: US 8,180,553 B2
(45) Date of Patent: **\*May 15, 2012**

(54) CONTROLLING CYLINDER MIXTURE AND TURBOCHARGER OPERATION

(75) Inventors: Julia Helen Buckland, Dearborn, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,584

(22) Filed: Jun. 24, 2011

(65) Prior Publication Data

US 2011/0270510 A1  Nov. 3, 2011

Related U.S. Application Data

(63) Continuation of application No. 12/882,077, filed on Sep. 14, 2010, now Pat. No. 7,987,040, which is a continuation of application No. 11/777,591, filed on Jul. 13, 2007, now Pat. No. 7,801,665.

(51) Int. Cl.
  *F02D 28/00* (2006.01)
  *F01L 1/34* (2006.01)
  *F02B 37/12* (2006.01)
  *F02D 41/00* (2006.01)
  *F02B 33/44* (2006.01)

(52) U.S. Cl. .......... 701/103; 701/105; 60/605.1; 60/602

(58) Field of Classification Search .......... 701/103–105, 701/102, 101; 123/90.15, 90.17, 568.21, 123/568.19, 568.11; 60/274, 285, 600–603, 60/605.1

See application file for complete search history.

(56) References Cited

U.S. PATENT DOCUMENTS

| | | | |
|---|---|---|---|
| 4,483,146 A | 11/1984 | Morikawa |
| 4,485,626 A | 12/1984 | Moriguchi |
| 4,981,017 A | 1/1991 | Hara et al. |
| 5,064,423 A | 11/1991 | Lorenz et al. |
| 5,090,204 A | 2/1992 | Bonitz et al. |
| 5,845,495 A | 12/1998 | Schray et al. |
| 6,158,218 A | 12/2000 | Herold et al. |
| 6,202,414 B1 | 3/2001 | Schmidt et al. |
| 6,273,076 B1 | 8/2001 | Beck et al. |
| 6,276,138 B1 | 8/2001 | Welch |
| 6,318,083 B1 | 11/2001 | Machida et al. |
| 6,554,088 B2 | 4/2003 | Severinsky et al. |

(Continued)

FOREIGN PATENT DOCUMENTS

JP   200746487 A   2/2007

(Continued)

OTHER PUBLICATIONS

US 6,754,575, 06/2004, Buckland et al. (withdrawn)

*Primary Examiner* — Hieu T Vo
(74) *Attorney, Agent, or Firm* — Allan J. Lippa; Alleman Hall McCoy Russell & Tuttle LLP

(57) ABSTRACT

A method for controlling differences in exhaust gas residual amount for a two cylinder bank engine having at least one turbocharger is presented. In one example, the description includes a method for adjusting valve timing to reduce cylinder exhaust gas residual variation.

20 Claims, 5 Drawing Sheets

U.S. PATENT DOCUMENTS

| | | |
|---|---|---|
| 6,874,463 B1 | 4/2005 | Bolander et al. |
| 7,107,761 B2 | 9/2006 | Fukuma et al. |
| 7,181,332 B1 | 2/2007 | Vick et al. |
| 7,380,447 B2 | 6/2008 | Rollinger et al. |
| 7,621,126 B2 | 11/2009 | Kolmanovsky et al. |
| 7,640,744 B2 | 1/2010 | Rollinger et al. |
| 7,770,393 B2 | 8/2010 | Buckland et al. |
| 7,801,665 B2 | 9/2010 | Buckland et al. |
| 7,987,040 B2 * | 7/2011 | Buckland et al. ............. 701/103 |
| 2004/0016419 A1 | 1/2004 | Satou et al. |
| 2005/0172628 A1 | 8/2005 | Fukasawa et al. |
| 2009/0018756 A1 | 1/2009 | Storhok et al. |

FOREIGN PATENT DOCUMENTS

| | | |
|---|---|---|
| JP | 2007046487 A * | 2/2007 |
| JP | 2007154844 A | 6/2007 |

* cited by examiner

CONTROLLING CYLINDER MIXTURE AND TURBOCHARGER OPERATION

CROSS REFERENCE TO RELATED APPLICATIONS

The present application is a continuation of U.S. patent application Ser. No. 12/882,077, filed Sep. 14, 2010, now U.S. Pat. No. 7,987,040 B2, issued on Jul. 26, 2011, which is a continuation of U.S. patent application Ser. No. 11/777,591, filed Jul. 13, 2007 and now U.S. Pat. No. 7,801,665, the entire contents of both of which are incorporated herein by reference.

FIELD

The present description relates to a method for controlling a cylinder mixture of an internal combustion engine having a turbocharger and a variable event valvetrain.

BACKGROUND

One method to operate an internal combustion engine having a turbocharger is presented in U.S. Pat. No. 6,202,414. This method presents a way to balance the output of two turbochargers that are in communication with different cylinder banks of a "V" engine. Balancing the output of two turbochargers can improve turbocharger efficiency and mitigate the possibility of compressor surge. This method uses state parameters that are in the vicinity of the turbocharger compressors to adjust the effective turbine cross section, thereby regulating compressor flow. The method attempts to reduce any difference in state parameters between two cylinder groups to zero. That is, the method attempts to equalize the state parameters of the two cylinder groups that are in communication with the two turbochargers.

The above-mentioned method can also have several disadvantages. For example, the method simply adjusts a turbocharger waste gate or variable geometry vane position, thereby simultaneously affecting turbocharger and cylinder operation. Specifically, turbine energy is altered along with the amount of air and exhaust gas residuals that comprise the cylinder mixture. In other words, adjusting the waste gate or vane position changes the exhaust backpressure and can affect the amount of exhaust gas residuals that are trapped in a cylinder since the exhaust backpressure acts to impede flow from the cylinder. Further, when cylinder volume is displaced by additional residual exhaust gas, there is less available space for fresh air in the cylinder. Consequently, cylinder charge air amount and cylinder charge residual amount may change in an undesirable manner when a waste gate or turbine vanes are adjusted to regulate a turbocharger. As a result, regulation and/or control of a turbocharger may have undesirable effects on engine emissions, fuel consumption, performance, audible noise, and uniform cylinder torque production.

The inventors herein have recognized the above-mentioned disadvantages and have developed a method to control an engine having variable event valve operation and at least one turbocharger.

SUMMARY

One embodiment of the present description includes a method for controlling an internal combustion engine, the method comprising: varying valve operation of at least a cylinder in a second group of cylinders as a waste gate position of a first turbocharger is adjusted, said first turbocharger located in the exhaust path of a first group of cylinders. This method overcomes at least some of the limitations of the previously mentioned methods.

Variable valve operation provides an additional degree of freedom to equalize cylinder mixtures and balance mass flow through different cylinder groups of a turbocharged engine. By adjusting valve timing relative to crankshaft position and/or by adjusting valve lift, mixture differences and flow differences between different cylinder groups of a turbocharged engine can be reduced. For example, a "V" engine having two cylinder groups and two turbochargers can have less cylinder mixture variation between cylinder banks when engine valve timing is used to equalize exhaust gas residuals between the cylinder banks. Specifically, valve timing can be used to adjust the exhaust gas residual amount and cylinder air charge at a given intake manifold pressure. Therefore, if one bank of a turbocharged cylinder experiences a different cylinder backpressure than the other cylinder bank, due to different waste gate positions of the two turbochargers for example, valve timing adjustments can be used to mitigate differences in exhaust gas residuals and cylinder charge mixtures between the cylinder banks.

In another aspect of the present description, engine valve adjustments can be made in conjunction with turbocharger waste gate or vane adjustments to equalize flow between compressors while also reducing variation of exhaust gas residuals between cylinder banks. In one example, the position of turbocharger waste gates and the valve timing of exhaust valves can be adjusted to regulate energy supplied to the turbines and exhaust gas residuals of an engine having two cylinder banks. If a compressor approaches a surge condition, its waste gate can be opened and exhaust valve timing retarded so that residuals are maintained at the same time that the amount of exhaust gas energy delivered to the turbocharger is lowered.

The present description may provide several advantages over prior systems and methods. Specifically, the present method can achieve desired cylinder mixtures while regulating turbocharger operation, at least during some conditions. Further, the method can improve engine emissions because cylinder exhaust gas residuals can be controlled even if there are exhaust backpressure differences between cylinder banks. In addition, the method can produce more uniform cylinder mixtures and provide torque that is more uniform or equal between engine cylinder banks or cylinders.

The present method also provides unexpected results. Specifically, the method makes it possible to make finer adjustments to the turbocharger compressor flow so that the compressor may be operated closer to the compressor surge region. This can extend the turbocharger operating envelope. Also, the method can improve turbocharger durability and reduce warranty because the possibility of entering surge conditions when regulating compressor flow at low flow conditions is reduced.

The above advantages and other advantages and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
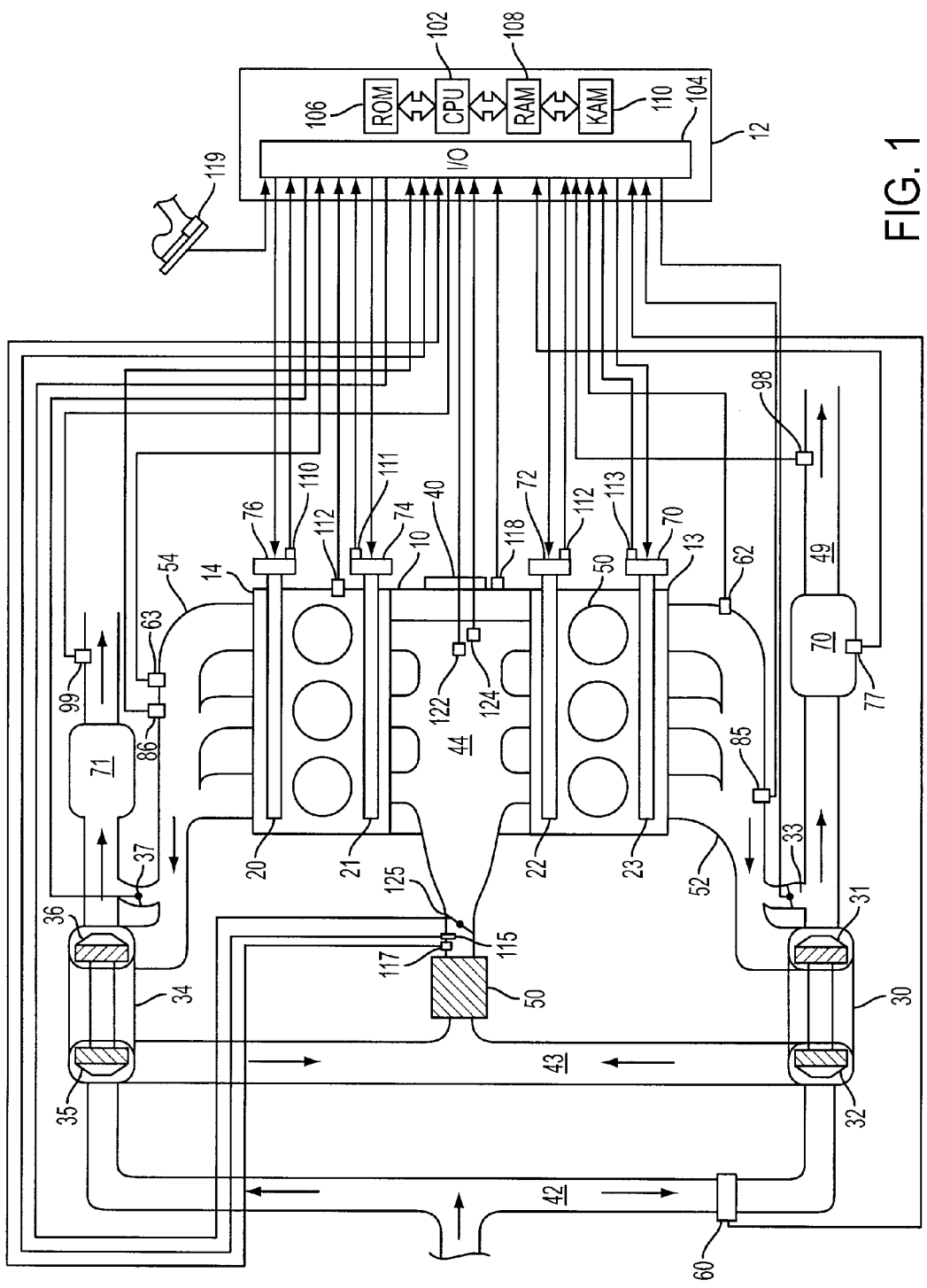
FIG. 1 is a schematic diagram of a turbocharged engine.

Referring to FIG. 1, internal combustion engine 10 is controlled by electronic engine controller 12. Engine 10 includes a plurality of cylinders in a "V" configuration that are similar to cylinder 50. Cylinder banks 13 and 14 are comprised of three cylinders each. Intake cams 21 and 22 operate intake valves (not shown) to regulate airflow into the cylinders of banks 13 and 14. Exhaust cams 20 and 23 operate exhaust valves (not shown) to regulate exhaust flow out of cylinder banks 13 and 14. Timing of intake and exhaust cams relative to crankshaft position can be varied by adjusting phasors 76, 74, 72, and 70. Alternatively, one or more intake or exhaust valves may be operated without assistance from a mechanical cam (e.g., electrically or hydraulically actuated valves). Further, intake and/or exhaust valves may be configured to vary valve lift. Each cylinder surrounds a piston that transfers combustion energy to mechanical energy through crankshaft 40. Intake manifold 44 is in communication with electronically controlled throttle 125 and directs air to cylinder banks 13 and 14. Intake air is routed through duct 42 and mass airflow sensor 60 before being compressed by first turbocharger 30. A second turbocharger 34, also compresses air from duct 42. Compressed air is routed through duct 43 to intercooler 50 and proceeds to the inlet of electronic throttle 125. Combusted gases exit cylinder banks 13 and 14 through exhaust manifolds 52 and 54. Exhaust gases rotate turbines 31 and 36 of turbochargers 30 and 34, turbines 31 and 36 cause compressors 32 and 35 to rotate compressing fresh air. Waste gates 33 and 37 (i.e., turbocharger control actuators) allow exhaust gases to bypass turbines 31 and 36 so that turbine flow of each turbocharger can be controlled. Alternatively, turbines 31 and 35 may have adjustable vanes (i.e., turbocharger control actuators) that allow the compressor and turbine flow to be controlled. Also, if desired, a single turbocharger can be used to compress fresh air for both cylinder banks.

Distributorless ignition system (not shown) provides ignition spark to the cylinders of banks 13 and 14. Universal Exhaust Gas Oxygen (UEGO) sensors 85 and 86 are shown coupled to exhaust manifolds 52 and 54 upstream of catalytic converters 70 and 71. Alternatively, two-state exhaust gas oxygen sensors may be substituted for UEGO sensors 85 and 86. Two-state exhaust gas oxygen sensor 98 is shown coupled to exhaust pipe 49 downstream of catalytic converter 70. Alternatively, sensor 98 can also be a UEGO sensor. A second two-state oxygen sensor 99 is shown similarly situated. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example. A second catalytic converter 71 processes exhaust gases on the opposite cylinder bank.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112; a position sensor 119 coupled to an accelerator pedal; a measurement of engine manifold pressure (MAP) from pressure sensor 122 coupled to intake manifold 44; crankshaft position 118; camshaft positions 110-113; exhaust manifold pressure 62-63; throttle inlet air pressure 115; throttle inlet air temperature 117, and a measurement (ACT) of engine air amount temperature or manifold temperature from temperature sensor 124.

The engine described in FIG. 1 may be the primary means of generating motive force in a vehicle or it may be part of a vehicle having more than one means for generating motive force, a hybrid vehicle for example. The engine may generate wheel torque in conjunction with an electric motor when in a hybrid configuration. Alternatively, the engine may generate wheel torque in conjunction with a hydraulic motor. Thus, there are many configurations whereby features of the present description may be used to advantage.

Referring now to FIG. 2, a flow chart of a method for simultaneously controlling flow through two turbochargers is shown.

Engines can be configured with two turbochargers to reduce turbocharger lag and the lack of engine torque response associated with it. Turbocharger lag is caused by the time it takes air to pass through an engine, combust with fuel, and deliver energy to a turbine. The turbine's inertial resistance to motion also contributes to lag. By installing two low inertia turbochargers in a two cylinder bank engine, the turbochargers can spin up faster and reach efficient flow conditions so that compressed air is delivered to the engine cylinders faster. However, lower inertia turbochargers can have lower pumping capacities than higher inertial turbochargers. Consequently, two low inertia turbochargers can be used in different cylinder banks to achieve pumping capacity that is similar to that of a larger turbocharger while retaining lower inertia. Thus, torque response can be improved in a twin turbocharged system without reducing high load performance. However, operating two turbochargers presents a challenge of ensuring substantially equal performance between the two compressors so that the compressors do not enter surge conditions. The method of FIG. 2 can be used to balance compressor performance.

In step 201, the routine determines engine operating conditions. Engine operating conditions can be determined and/or monitored by sampling data from various vehicle and/or engine sensors shown, but not limited to those illustrated in FIG. 1. For example, engine temperature can be determined by sampling the output of the engine coolant temperature sensor 112 that is shown in FIG. 1. In addition, engine operating conditions can include, but are not limited to the pressure in the engine intake manifold, the air temperature in the engine intake manifold, the pressure in the engine exhaust manifolds, the temperature in the engine exhaust manifolds, the state of an engine exhaust gas oxygen sensors, the engine torque request, engine speed, and barometric pressure. After engine operating conditions are determined, the routine proceeds to step 203.

In step 203, the desired air mass flow rate is determined from the current engine speed and an operator torque request. The operator torque request may be determined from observing the position of an accelerator pedal, a lever, or from a signal produced by an external system (e.g., an analog or digital command from a hybrid vehicle controller). The torque request signal is transformed into a driver brake torque request by way of a two dimensional table that contains engine speed data verses accelerator pedal position. When queried, the table outputs a desired driver brake torque. The desired driver brake torque is summed with the torque used to operate accessories and an estimate of engine pumping torque to calculate a desired engine brake torque. This is illustrated by the following equation:

$$\Gamma_{eng\_brake\_tor} = \Gamma_{driver} + \Gamma_{acc} + \Gamma_{pump}$$

where $\Gamma_{eng\_brake\_tor}$ is the requested engine brake torque, $\Gamma_{driver}$ is the requested or desired driver torque demand, $\Gamma_{acc}$ is the torque to power accessories (e.g., an air conditioning compressor), and $\Gamma_{pump}$ is the engine pumping torque. The requested engine brake torque and current engine speed are then used to index a table that outputs an engine load. The engine load is converted to an air mass flow rate by the following equation:

$$des\_am = sarchg * N * \frac{Num\_cyl}{2} * Load$$

where des_am is the desired air mass flow rate of the engine, sarchg is the cylinder air charge capacity based on the cylinder volume at standard temperature and pressure, N is the engine speed, Num_cyl is the number of engine cylinders, and Load is a fractional number that represents an engine air capacity. The specific air charge in a cylinder can be determined by the equation:

$$Cyl\_air\_chg = Load * sarchg$$

The desired cylinder air charge can then be converted into an intake manifold pressure by using the relationship between cylinder air charge and intake manifold pressure. Specifically, in some variable cam configurations, a nearly linear relationship exists between cylinder air charge and intake manifold pressure, see FIGS. 5-6 for example, at a given engine speed and cam positions. A family of curves that are based on engine speed and cam positions can be stored that describe the relationship between cam positions, engine speed, cylinder air charge, and manifold pressure. These tables can be indexed by using the current engine speed, cam positions, and desired cylinder air charge to determine a desired intake manifold pressure. The desired intake manifold pressure is determined by interpolating between a limited number of empirical curves that describe cylinder air charge in relation to cam positions and intake manifold pressure. In other variable cam configurations, a quadratic relationship exists between intake manifold pressure and cylinder airflow. In these cases, it is possible to solve the roots of the equation and obtain an equation that outputs manifold pressure as a function of cylinder air charge at given cam positions. U.S. patent application Ser. No. 11/423,433 describes the relationship between cylinder air charge and manifold pressure and is hereby fully incorporated by reference for all intents and purposes.

The desired manifold pressure is achieved by setting the position of the throttle plate to match the desired cylinder airflow. Specifically, the throttle position is set based on the desired pressure ratio across the throttle (i.e., the pressure ratio between desired manifold pressure and throttle inlet pressure) and a throttle angle that produces the desired flow at the desired pressure ratio across the throttle. If desired, the throttle plate position can be adjusted further using a proportional/integral controller that moves the throttle plate based on feedback from a manifold pressure sensor.

For applications having valves that can be operated independent of crankshaft position, electrically actuated valves for example, the method described in U.S. Pat. No. 7,079,935, which is hereby fully incorporated by reference for all purposes, may be used to determine valve timing. In this embodiment, the desired manifold pressure can be determined by indexing a table that outputs desired manifold pressure using engine speed and operator torque demand. Throttle position can be set as described above. The routine proceeds to step 205.

In step 205, the turbocharger waste gate position or vane position is set. Engine speed and desired engine load are used to index a table that outputs a desired waste gate position. The waste gate position can be further adjusted for a throttle inlet pressure error (i.e., the desired throttle inlet pressure minus the actual throttle inlet, pressure) by adjusting the waste gate position in response to the throttle inlet pressure error. In one example, a proportional/integral controller can be used to make waste gate adjustments based on the throttle inlet pressure error. The routine continues to step 207.

In step 207, the open-loop camshaft positions or valve timings are determined. Alternatively, valve lifts may be determined in this step in substantially the same manner, i.e., by indexing predetermined tables and/or functions. Engine speed and desired engine torque are used to index tables that output empirically predetermined cam positions or valve timings for each cylinder bank. The routine proceeds to step 209.

In step 209, the routine determines whether or not to make valve timing, valve lift, and/or waste gate/vane adjustments to correct for flow differences between two compressors. For example, when an engine is operating at 1500 RPM, the mass flow of one compressor can exceed the mass flow rate through the other compressor. As such, the valve timing/lift of one or both cylinder banks can be adjusted to reduce variations in compressor flow rates.

To determine whether or not valve adjustments are desirable, a comparison is made between the mass of air flowing through each compressor. In one example where a single mass airflow sensor is used, it is possible to measure flow through one compressor and estimate the flow through the other compressor. The estimated compressor flow can be determined from the following equation:

$$\dot{m}_{c,2} = am - \dot{m}_{c,1}$$

where am is the engine air mass which can be determined from engine speed, intake manifold pressure, volumetric efficiency, and the ideal gas law PV=nRT, $\dot{m}_{c,1}$ is the measured flow rate through compressor 32, and $\dot{m}_{c,2}$ is the flow rate through compressor 35. To improve the estimate during transient conditions the following equation may be used:

$$\frac{s}{\tau s + 1} P_{c,out} = \frac{RT_{tct}}{V_{tim}} \left( \frac{1}{\tau s + 1} \right) (\dot{m}_{c,1} + \dot{m}_{c,2} - \dot{m}_{thr})$$

This expression can be solved for $\dot{m}_{c,2}$, with s being the Laplace variable and $$\frac{s}{\tau s+1} \text{ and } \frac{1}{\tau s+1}$$

denoting a high pass filter and a low pass filter respectively. $P_{c,out}$ is defined as the pressure at the compressor outlet, which can be estimated from measured pressure at the throttle inlet, $P_{tip}$, and the estimated pressure loss across the intercooler; $T_{tct}$ is the measured temperature at the throttle inlet; and $\dot{m}_{thr}$ is the mass flow rate through the throttle, which can be determined as described above.

Once the individual compressor flow rates have been determined, the compressor flow rates are compared to determine if an imbalance exists. In one example, the comparison is made using the following equation:

$$\text{comp\_error} = \dot{m}_{c,1} - \dot{m}_{c,2}$$

where comp_error represents the compressor flow error between the two turbochargers, $\dot{m}_{c,1}$ is compressor number one flow rate, and $\dot{m}_{c,2}$ is compressor number two flow rate. After the compressor flow error is determined, the routine can determine if the error is large enough to warrant a correction of valve timing/lift. If desired, the routine can limit compressor flow corrections to one or more predetermined magnitudes of error. That is, if the compressor flow error is below some predetermined value, then no correction will be made to compensate for the error. In another embodiment, the flow error between compressors can be compensated as long as the error is present.

In step 209, the routine also determines if adjustments to valve timing/lift, throttle plate position, and turbocharger (e.g., waste gate or turbine vane position adjustments) are to be made to limit the possibility of compressor surge. If the compressor is operating near or goes into the compressor surge boundary, the valve timing/lift can be adjusted such that the engine's volumetric efficiency is decreased, thereby lowering the pressure ratio across the compressor and reducing the possibility of compressor surge. In this example the ignition spark may be advanced during some conditions to offset a portion of any torque loss that may occur as a result of the valve timing adjustment. As a result, the possibility of compressor surge can be mitigated by adjusting valve timing/lift with less variation in engine torque.

On the other hand, consider a condition where it is desirable to increase flow through at least one compressor. When, for example, best volumetric efficiency occurs when both IVO and EVC occur at top-dead-center (TDC), a cam timing that opens intake valves after TDC can be advanced toward TDC so that engine volumetric efficiency increases. If desired, spark can be retarded and/or fuel may be reduced so that engine torque doesn't increase as the engine volumetric efficiency is increased. Thus, the cylinder flow and exhaust temperature are increased and deliver more energy to accelerate the turbocharger turbine. If the routine determines that cylinder flow compensation or surge control is desired, the routine proceeds to step 211. Otherwise, the routine proceeds to exit.

In step 211, adjustments are made to vary compressor flow.

In one embodiment, the relationship between the intake valve opening (IVO) position and engine volumetric efficiency is used to determine valve adjustments that vary cylinder flow for both cylinder banks of a "V" engine. Further, cylinder flow rates are used to adjust the downstream turbine flow rates, thereby adjusting the flow of two compressors. In particular, the present position of each cam, or valve opening timing for each cylinder bank, is evaluated with respect to the location of best volumetric efficiency to determine how to adjust the valve timing. Then, one cam is advanced while the other cam is retarded. This causes flow from one compressor to increase while flow from the other compressor is reduced. The valve timing adjustments also cause the overall cylinder air flow rate to remain substantially constant while the compressor flow rates are converging to an equalized flow rate. For example, if best volumetric efficiency occurs when both IVO and EVC occur at top-dead-center (TDC) and if intake valves of both cylinder banks of a "V" engine open 10 degrees before TDC (i.e., it is advanced) and a reduction in cylinder flow is desired in one cylinder bank, then the valve timing of the cylinder bank where lower flow is desired can be further advanced (e.g., 15 degrees before TDC) to reduce the cylinder or cylinder bank mass flow rate. On the other hand, the valve timing of the other cylinder bank can be simultaneously retarded, thereby counteracting the valve timing advance on the opposite cylinder bank. Additional details describing the relationship between volumetric efficiency, IVO, and exhaust valve closing (EVC) are given in the description of FIG. 3.

Desired. IVO locations can be determined using the following equations:

$$\text{ivo\_des\_1} = \text{ivo\_des}(N, \Gamma_{eng\_brake\_tor}) + K_c * \text{comp\_error}$$

$$\text{ivo\_des\_2} = \text{ivo\_des}(N, \Gamma_{eng\_brake\_tor}) - K_c * \text{comp\_error}$$

where ivo_des_1 is the desired IVO timing for cylinder bank number one, $\text{ivo\_des}(N, \Gamma_{eng\_brake\_tor})$ is the base IVO timing determined from step 207 above, and $K_c$ is a predetermined gain that may take on one or more values. For example, $K_c$ may be a constant or it may be a variable that is determined by indexing a table using engine speed and load.

In another embodiment, cylinder flow can be adjusted by changing the position of a waste gate and by adjusting valve timing. In engine operating regions where only the waste gate is inactive, the following may be used to determine actuator commands:

If $P\_\text{boost\_des} < P^*\_\text{boost}$ $$\text{ivo\_des\_1} = \text{ivo\_des}(N, \Gamma_{eng\_brake\_tor}) + K_c * \text{comp\_error}$$

$$\text{ivo\_des\_2} = \text{ivo\_des}(N, \Gamma_{eng\_brake\_tor}) - K_c * \text{comp\_error}$$

Else $$\text{ivo\_des\_1} = \text{ivo\_des}(N, \Gamma_{eng\_brake\_tor})$$

$$\text{ivo\_des\_2} = \text{ivo\_des}(N, \Gamma_{eng\_brake\_tor})$$

$$\text{WG\_des\_1} = \text{WG\_des}(N, \Gamma_{eng\_brake\_tor}, P\_\text{boost}) + K_w * \text{comp\_error}$$

$$\text{WG\_des\_2} = \text{WG\_des}(N, \Gamma_{eng\_brake\_tor}, P\_\text{boost}) - K_w * \text{comp\_error}$$

where WG_des_1 and WG_des_2 are the desired waste gate position commands, WG_des is the desired waste gate position, P_boost_des is the desired boost pressure, P*_boost is the boost pressure at which the waste gate actuator achieves authority, and $K_w$ is a waste gate gain term which may be a constant or variable. When both actuators may be used simultaneously, intake valve timing and waste gate adjustment can be accomplished with the following equations:

$$\text{ivo\_des\_1} = \text{ivo\_des}(N, \Gamma_{eng\_brake\_tor}) + K_c \cdot \text{comp\_error}$$

$$\text{ivo\_des\_2} = \text{ivo\_des}(N, \Gamma_{eng\_brake\_tor}) - K_c \cdot \text{comp\_error}$$

$$\text{WG\_des\_1} = \text{WG\_des}(N, \Gamma_{eng\_brake\_tor}, P\_\text{boost}) + K_w \cdot \text{comp\_error}$$

$$\text{WG\_des\_2} = \text{WG\_des}(N, \Gamma_{eng\_brake\_tor}, P\_\text{boost}) - K_w \cdot \text{comp\_error}$$

The above equations allow cylinder mass flow adjustments to be made to equalize flow between compressors during varying operating conditions. In one example, compressor flow can be equalized by reducing the mass flowing through a cylinder bank to lower flow through a first turbocharger turbine while the mass flow of the other cylinder bank is increased through a second turbocharger turbine. In another example, the mass flowing through two cylinder banks can be reduced to decrease flow through two turbocharger turbines and prevent compressor surge. In still another example, mass flowing through two cylinder banks can be increased improve flow through two turbocharger turbines, thereby increasing the compressor flow rate.

Specific intake and exhaust valve timing adjustments may be empirically determined and stored in memory when a cylinder bank flow adjustment is requested. Or alternatively, valve timings can be revised by finding geometric solutions that are used to adjust engine exhaust residuals (i.e., combusted air-fuel mixtures) and cylinder air charge to desired amounts. In particular, the method described in U.S. Pat. No. 6,754,575, which is hereby fully incorporated by reference for all, purposes, may be used to determine valve timings. Further, waste gate or vane positions can be scheduled and varied as intake and exhaust valve timing is varied by simply adding an exhaust valve adjustment term that is similar to the intake valve adjustment term ivo_des_1.

Similarly, where valve lift is adjusted, a multi-dimensional table including engine speed, intake manifold pressure, and valve lift amount can be used in conjunction with compressor flow error to determine valve lift adjustments that will adjust turbine flow by adjusting the cylinder flow rate.

In addition, the throttle position determined in step 203 can be updated so that the engine delivers the desired torque even after valve timing, waste gate, and/or lift adjustments have been made. For example, if a valve timing adjustment is made to increase the cylinder flow rate while the engine torque demand remains constant, the throttle position can be adjusted by an increment that represents the corresponding flow rate reduction that is desired in the opposite cylinder bank to balance the torque between the cylinder banks. Thus, in this example, the throttle adjustment counteracts the additional torque that can result from the valve adjustment.

In step 213, the desired valve operational adjustments are output to actuators. In one example, the camshaft angular position with respect to crankshaft timing is converted into duty cycle signals that cause the cam actuators to advance or retard through the control of oil flow to the cam phase actuator. The camshaft phase angle controller may simply output commands from steps 207 and 211 that position the camshaft in an open loop manner, or the controller may utilize camshaft position feedback and a proportional/integral position controller. Valve lift amounts are similarly processed. In system configurations that utilize other types of variable valve actuators, electrically or hydraulically controlled actuators for example, timing or lift adjustment can be simply be made to revise the timing that driver circuitry actuates particular valve actuators. The routing proceeds to step 215.

In step 215, the desired fuel mass charge is determined. The compensated cylinder air charge mass is multiplied by the desired air-fuel ratio to determine the desired fuel mass. The routine exits after the fuel delivery has been updated. Referring now to FIG. 2B, a flow chart of a method for simultaneously controlling an engine cylinder mixture and regulating operating conditions of a turbocharger is shown.

The method of FIG. 2B controls cylinder mixtures of a turbocharged engine while simultaneously controlling turbocharger operation. The method describes using different types of actuators to balance residual concentrations in cylinders of a two cylinder bank engine. The method may be applied to an engine having one or more turbochargers. In one embodiment, valve timing and/or lift can be used to regulate cylinder mixtures while exhaust backpressure and turbine flow are varied by adjusting the position of a turbocharger waste gate. In another example, valve timing and/or lift adjustments can be combined with throttle plate position adjustments and waste gate adjustments to control cylinder residuals and cylinder air charge. Further, timing adjustments may be made on per cylinder or per cylinder bank basis. That is, valve operations for an individual cylinder or all cylinders of a cylinder bank may be made. This method can improve engine emissions and engine torque, at least under some conditions.

In another aspect of the present system and method, the cylinder mixture contents of individual cylinders can be adjusted such that cylinder mixture regulation is not limited to banks or groups of cylinders. That is, adjustments may be directed to individual cylinders so that cylinder mixture variations between individual cylinders are reduced. This may be beneficial when there are differences in flow paths leading to and from different cylinders. In one example, individual cylinder adjustments can be accomplished by electrically actuated valves. These valves can be operated such that each cylinder has valve timing that is different from other cylinders, if desired.

Figure 2A:
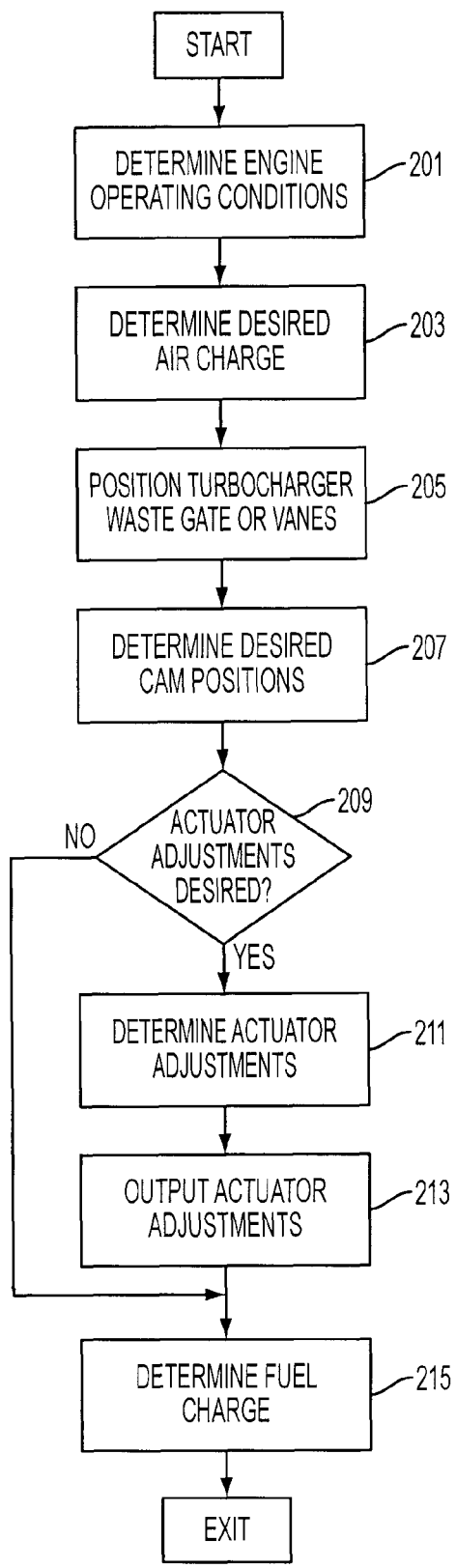
FIG. 2A is a flow chart of an example engine control strategy.
Figure 2B:
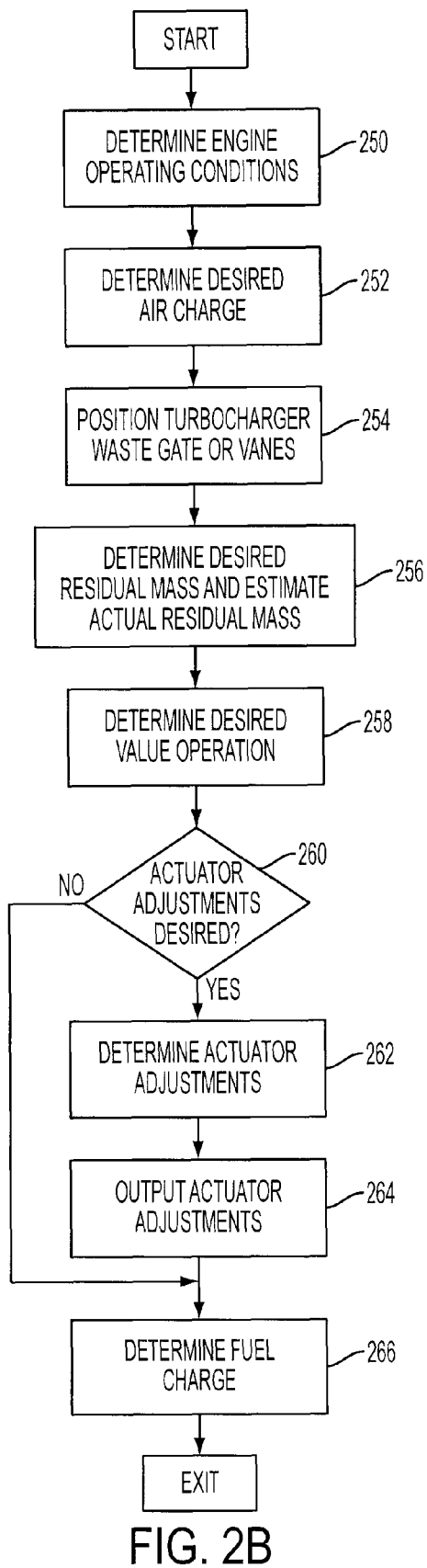
FIG. 2B is flow chart of another example engine control strategy.

Steps 250-254 of FIG. 2B are identical to steps 201-205 in FIG. 2A. As such, the description of steps 201-205 apply to steps 250-254, the description for steps 250-254 is omitted to make a more concise description.

In step 256, the routine determines the desired residual mass and estimates the actual residual mass. The desired residual mass is determined by interpolating between cells of tables or functions that contain empirically determined data that describe desirable amounts or percentages of residuals for selected engine operating conditions. The tables or functions are indexed based on engine speed and engine load. Typically, both cylinder banks operate with the same cylinder residual amount but it is possible to have different residual amounts for each cylinder bank.

Figure 5:
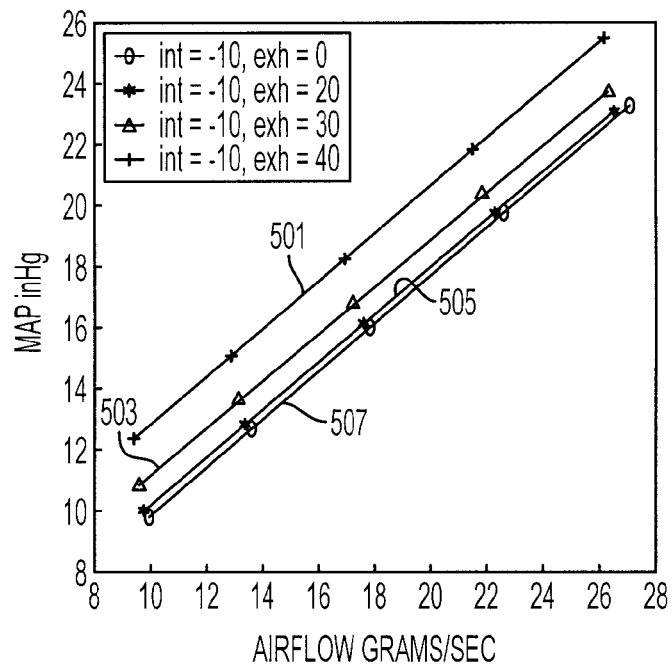
FIG. 5 is a plot of the effect of variable exhaust valve timing on cylinder airflow.
Figure 6:
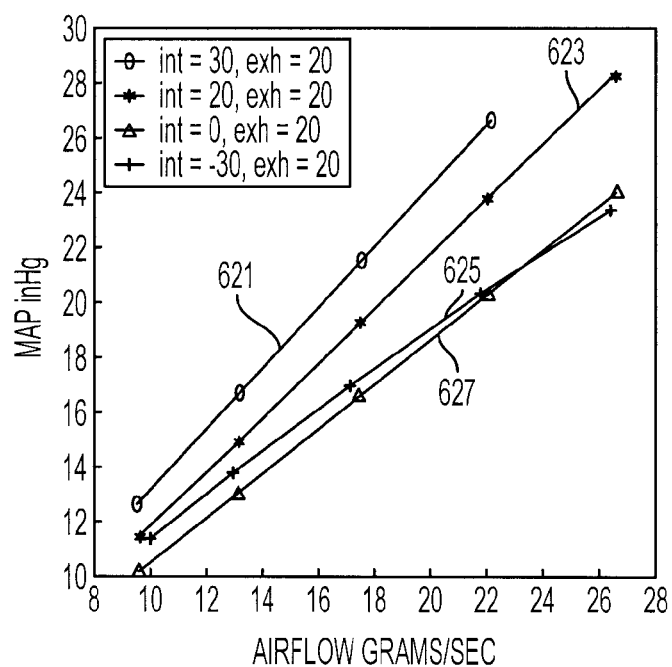
FIG. 6 is a plot of the effect of variable intake valve timing on cylinder airflow.

The actual cylinder residual amount for each cylinder bank can be estimated by interrogating a set of tables or function similar to those shown in FIGS. 5 and 6. The functions are empirically determined and describe the relationship between the position of a cam or valve timing, cylinder airflow, and intake manifold pressure. The tables or functions describe representations similar to those illustrated in FIGS. 5 and 6. Further, these representations can be compensated for variations in cylinder back pressure by adjusting the offset term that is described below, $c_2 \cdot (P_{exh}/P_{nom})$, in relation to the exhaust backpressure. The relationships illustrated in the lines shown in FIGS. 5 and 6 can be expressed as the equation of a straight line taking the form:

$$P_m = c_1 \cdot m_{air} + c_2 \cdot \frac{P_{exh}}{P_{nom}}$$

where $P_m$ the intake manifold pressure, $m_{air}$ is the mass of air in the cylinder, $P_{exh}$ is the exhaust manifold pressure at the current operating condition, $c_1$ and $c_2$ are functions of intake and exhaust valve timing or cam position, and $P_{nom}$ is the manifold pressure with the engine off (barometric pressure). Rearranging to solve for $m_{air}$ gives:

$$m_{air} = \left(\frac{P_m}{c_1}\right) - \left(\frac{c_2}{c_1} \cdot \frac{P_{exh}}{P_{nom}}\right).$$

Thus, the residual mass, $r_m$, is defined as:

$$r_m = \left(\frac{c_2}{c_1} \cdot \frac{P_{exh}}{P_{nom}}\right)$$

The residual mass is determined by indexing equations of lines that are similar to those represented in FIGS. 5 and 6 using the present cam positions or valve timings, engine load, and engine speed. These data are then used to determine the current residual mass as described above. The routine proceeds to step 258.

Two versions of steps 258-262 are presented to describe two embodiments. The first embodiment is for an engine having two cylinder banks and a single turbocharger. The second embodiment is for an engine having two cylinder banks and two turbochargers, one turbocharger per cylinder bank.

Single turbocharger embodiment: In step 258, the open-loop camshaft positions or valve timings for each cylinder bank are determined. Alternatively, valve lifts may be determined in this step in substantially the same manner, i.e., by indexing predetermined tables and/or functions. Engine speed and desired engine torque are used to index tables that output empirically predetermined cam positions or valve timings for each cylinder bank. In this embodiment, the open-loop valve timings are set so that overlap between intake and exhaust valves is increased as engine speed increases for the cylinder bank that does not have a turbocharger in its exhaust path. This increases the cylinder's residual mass fraction to account for the increased cylinder back pressure of the cylinder bank having a turbocharger in its exhaust path. The cams positions or valve timings can be adjusted such that variation of cylinder mixtures between cylinder banks is reduced. The particular cam timings or valve timings used to reduce cylinder mixture variation can be empirically determined at steady state engine operating conditions during engine mapping. The routine proceeds to step 260.

In step 260, the routine determines whether or not to make valve timing, valve lift, throttle, and turbocharger adjustments (e.g., repositioning the waste gate or turbine vanes) to correct for compressor flow differences and/or residual differences between cylinder banks. To determine whether or not valve adjustments are desired, the estimated residuals between each cylinder bank are compared. Cylinder residual comparisons are made as follows:

$$\text{bank1\_res\_error} = \text{mres}_{des} - \text{bank1\_m}_d$$

$$\text{bank2\_res\_error} = \text{mres}_{des} - \text{bank2\_m}_d$$

where bank1_res_error is the residual error for cylinder bank number one, $\text{mres}_{des}$ is the desired residual mass determined in step 256, bank1_$m_d$ is cylinder bank number one estimate of residual, bank2_res_error is the residual error for cylinder bank number two, and bank2_$m_d$ is cylinder bank number two estimate of residual. The terms bank1_$m_d$ and bank2_$m_d$ may be determined as described in step 256. Alternatively, the residual errors may be determined by the following equation:

$$\text{res\_error} = \text{bank1\_m}_d - \text{bank2\_m}_d$$

where res_error is the residual error between the two cylinder banks, and bank1_$m_d$ and bank2_$m_d$ are as described above. The res_error may be substituted for the bank1_res_error and bank2_res_error terms in the following equations when signs of the variables are taken into account.

After the cylinder bank exhaust residual mass errors are determined, the routine determines if the errors are large enough to warrant corrections to valve timing and lift. If desired, the routine can limit residual corrections to one or more predetermined magnitudes of error. That is, if the residual error between the two cylinder banks is below some predetermined value, then no correction will be made to compensate for the error. In another embodiment, the residual error between cylinder banks can be compensated as long as there is an error present.

Continuing with step 260, the routine also determines if adjustments to valve timing/lift, throttle position, and the turbocharger are to be made to limit the possibility of compressor surge. If the turbocharger is operating near or goes into the compressor surge region, the valve timing/lift can be adjusted such that a cylinder bank volumetric efficiency is decreased, thereby lowering the pressure ratio across the compressor and reducing the possibility of compressor surge. Several different approaches can be used to decide whether or not to take mitigating steps to control compressor surge. In one embodiment, the compressor surge boundary is stored in the engine controller memory. If the compressor is operating within a predetermined amount of compressor flow then valve timing can be adjusted to reduce cylinder flow and mitigate the possibility of entering a compressor surge condition. Likewise, if the compressor is operating within a predetermined pressure ratio amount of the compressor surge boundary, valve timing can be used to reduce cylinder flow. If the routine determines that cylinder residual compensation or compressor surge control is desired, the routine proceeds to step 262. Otherwise, the routine proceeds to exit.

In step 262, adjustments are made to vary compressor flow and/or cylinder residuals.

In one embodiment, the cam timing of the cylinder bank that does not have a turbine in its exhaust path is adjusted to match the cylinder residuals between cylinder banks. Intake valve timing, exhaust valve timing, or a combination of intake valve timing and exhaust valve timing adjustments may be used to accomplish balancing residual masses between cylinder banks. In one example, where engine flow is increasing and the exhaust pressure is increasing on the cylinder bank having a turbine in its exhaust path, the exhaust cam is retarded on the opposite cylinder bank to increase the cylinder residuals. In this example, retarding the exhaust cam increases the amount of valve overlap between intake and exhaust valves. That is, the amount if time during the period when intake and exhaust valves are simultaneously open is increased. The exhaust cam retard may follow a predetermined table or function based on empirical testing, or alternatively, the rate of cam retard may be based on the cylinder bank flow rate or on the pressure in the exhaust manifold of the cylinder bank without a turbine in its exhaust path.

In another embodiment, the exhaust valve timing of both cylinder banks may be adjusted to equalize cylinder residuals between the cylinder banks. The exhaust valve timings can be described as $$evo\_des\_1 = evo\_des(N, \Gamma_{eng\_brake\_tor}) + K_e * bank1\_res\_error$$

$$evo\_des\_2 = evo\_des(N, \Gamma_{eng\_brake\_tor}) - K_e * bank2\_res\_error$$

where evo_des_1 is the exhaust valve desired opening position, evo_des is the open-loop desired exhaust valve opening position, and Ke is a gain term. Thus, the exhaust valve opening positions are varied as cylinder residuals vary from the desired amount. This control action causes the residuals between the cylinder banks to converge to the same amount even though one cylinder bank has a turbine in its exhaust path. Adjusting the position of an exhaust cam causes the point at which lines describing cylinder air charge, as related to cam position and airflow, intersect zero air flow. This intersection identifies the amount of cylinder residuals and therefore indicates that the amount of cylinder residual exhaust gases change as a function of exhaust cam position. This concept can be seen from the separation of the lines in FIG. 5.

In addition, the throttle position determined in step 252 can be updated so that the engine delivers the desired torque even after valve operation and turbocharger adjustments have been made. For example, when a valve timing adjustment shifts the pumping characteristics of a cylinder bank the throttle position is adjusted to compensate of variation of the cylinder mass flow rate that may result from the adjusted valve operation. The throttle position is updated by the same method presented in step 203. The routine proceeds to step 264.

Two turbocharger embodiment: In step 258, the open-loop camshaft positions or valve timings for each cylinder bank are determined. Alternatively, valve lifts may be determined in this step in substantially the same manner, i.e., by indexing predetermined tables and/or functions. Engine speed and desired engine torque are used to index tables that output empirically predetermined cam positions or valve timings for each cylinder bank. Typically, the open-loop valve operations (i.e., timing/lift) are set equally between the cylinder banks, but it is possible to request different operations between the cylinder banks if desired. The routine proceeds to step 260.

In step 260, the routine determines whether or not to make valve timing, valve lift, throttle, and turbocharger adjustments to correct for compressor flow differences and/or residual differences between cylinder banks. As described in FIG. 2A, it can be desirable to substantially equalize flow rates between two compressors operating with two different cylinder banks. Flow rate balancing can be accomplished by waste gate and/or valve operating adjustments. However, as described in the background, equalizing compressor flow can sometimes result in backpressure differences between cylinder banks. If the residual gas fraction is different between the two cylinder banks valve operation can be adjusted to compensate for this condition, at least during some engine operating conditions.

To determine whether or not valve adjustments are desired, a comparison is made between the mass of air flowing through each compressor. Compressor flow errors are determined as described in step 209 of FIG. 2A. Further, the estimated residuals between each cylinder bank are compared. Cylinder residual comparisons are made as follows:

$$bank1\_res\_error = mres_{des} - bank1\_m_d$$

$$bank2\_res\_error = mres_{des} - bank2\_m_d$$

where bank1_res_error is the residual error for cylinder bank number one, $mres_{des}$ is the desired residual mass determined in step 256, $bank1\_m_d$ is cylinder bank number one estimate of residual, bank2_res_error is the residual error for cylinder bank number two, and $bank2\_m_d$ is cylinder bank number two estimate of residual. The terms $bank1\_m_d$ and $bank2\_m_d$ may be determined as described in step 256. Alternatively, the residual errors may be determined by the following equation:

$$res\_error = bank1\_m_d - bank2\_m_d$$

where res_error is the residual error between the two cylinder banks, and $bank1\_m_d$ and $bank2\_m_d$ are as described above. The res_error may be substituted for the bank1_res_error and bank2_res_error terms in the following equations when signs of the variables are taken into account.

After the cylinder bank exhaust residual mass errors are determined, the routine can determines if the errors are large enough to warrant corrections to valve timing and lift. If desired, the routine can limit residual corrections to one or more predetermined magnitudes of error. That is, if the residual error between the two cylinder banks is below some predetermined value, then no correction will be made to compensate for the error. In another embodiment, the residual error between cylinder banks can be compensated as long as there is an error present.

Referring again to step 260, the routine also determines if adjustments to valve timing/lift, throttle position, and the turbocharger are to be made to limit the possibility of compressor surge. If the turbocharger is operating near or goes into the compressor surge region, the valve timing/lift can be adjusted such that a cylinder bank volumetric efficiency is decreased, thereby lowering the pressure ratio across the compressor and reducing the possibility of compressor surge. Several different approaches can be used to decide whether or not to take mitigating steps to control compressor surge. In one embodiment, the compressor surge boundary is stored in the engine controller memory. If the compressor is operating within a predetermined amount of compressor flow then valve timing can be adjusted to reduce cylinder flow and mitigate the possibility of entering a compressor surge condition. Likewise, if the compressor is operating within a predetermined pressure ratio amount of the compressor surge boundary, valve timing can be used to reduce cylinder flow. If the routine determines that cylinder residual compensation or compressor surge control is desired, the routine proceeds to step 262. Otherwise, the routine proceeds to exit.

In step 262, adjustments are made to vary turbocharger flow and/or cylinder residuals.

During some engine operating conditions there are some system configurations that have limitations that make it difficult to simultaneously control turbocharger compressor flow and cylinder residual mass by valve timing alone. For example, systems that are configured to have fixed intake valve timing and variable exhaust valve timing with fixed valve lift duration. In this configuration, the opening and closing of exhaust valves can be varied relative to the crankshaft. When the exhaust cam timing is adjusted to vary cylinder residuals, the exhaust valve opening and closing positions move relative to the crankshaft. Since exhaust valve closing position can also alter flow from the cylinder to the turbine, the rate of flow from a cylinder to the turbine may change in an undesirable way.

Recognizing this, the inventors herein have determined that it can be desirable to simultaneously control a turbocharger using its waste gate and to control cylinder residuals using engine valve operating adjustments. When the waste gate and engine valves are controlled together, the adjustments to the waste gate and valves can be made to account for changes to the operation of one actuator that affect the control of the other actuator. For example, when the waste gate position is adjusted to vary boost pressure, valve operation can be adjusted to compensate for pressure changes in the exhaust system. Thus, the turbocharger waste gate and valves are adjusted together, and each actuator compensates for the effects of adjusting the other actuator, at least to some extent.

In one embodiment, where exhaust valve timing is adjustable, exhaust valve timings are used to vary cylinder residuals while turbocharger waste gate positions are adjusted to account for compressor flow imbalances. The waste gate commands are as described in step 213 of FIG. 2A:

$$WG\_des\_1 = WG\_des(N, \Gamma_{eng\_brake\_tor}, P\_boost) + K_w * comp\_error$$

$$WG\_des\_2 = WG\_des(N, \Gamma_{eng\_brake\_tor}, P\_boost) - K_w * comp\_error$$

The exhaust cam timings are $$evo\_des\_1 = evo\_des(N, \Gamma_{eng\_brake\_tor}) + K_e * bank1\_res\_error$$

$$evo\_des\_2 = evo\_des(N, \Gamma_{eng\_brake\_tor}) - K_e * bank2\_res\_error$$

where evo_des_1 is the exhaust valve desired opening position, evo_des is the open-loop desired exhaust valve opening position, and Ke is a gain term. Thus, the exhaust valve opening positions are varied as cylinder residuals vary from the desired amount. The result of this action is that the cylinder exhaust residuals change as the exhaust valve opening position is adjusted. Specifically, adjusting the position of an exhaust cam causes the point at which lines describing cylinder air charge, as related to cam position and airflow, intersect zero air flow. This intersection identifies the amount of cylinder residuals and therefore indicates that the amount of cylinder residual exhaust gases change as a function of exhaust cam position. This concept can be seen from the separation of the lines in FIG. 5.

In addition, the throttle position determined in step 252 can be updated so that the engine delivers the desired torque even after valve operation and turbocharger adjustments have been made. For example, when a valve timing adjustment shifts the pumping characteristics of a cylinder bank the throttle position is adjusted to compensate of variation of the cylinder mass flow rate that may result from the adjusted valve operation. The throttle position is updated by the same method presented in step 203. The routine proceeds to step 264.

In step 264, the desired valve timings or lift amounts are output to actuators. In one example, the camshaft angular position with respect to crankshaft timing is converted into duty cycle signals that cause the cam actuators to advance or retard through the control of oil flow to the cam phase actuator. The camshaft phase angle controller may simply output commands from steps 258 and 264 that position the camshaft in an open loop manner, or the controller may utilize camshaft position feedback and a proportional/integral position controller. Valve lift amounts are similarly processed. The routine proceeds to step 266.

In step 266, the desired fuel mass charge is determined. The compensated cylinder air charge mass is multiplied by the desired air-fuel ratio to determine the desired fuel mass. The routine exits after the fuel delivery has been updated.

Note that turbine vane position adjustments can be readily substituted for waste gate adjustments in the above description, if desired. Also note that spark adjustments may be included in the methods described in FIGS. 2A and 2B. Spark can be adjusted as a function of cylinder load, engine speed, and residuals. Additionally, spark may be adjusted to increase or decrease the amount of energy being delivered to a turbine. Further, the methods described in FIGS. 2A and 2B can include adjustments for the fueling amount and timing. Likewise, fuel adjustments can be used to increase or decrease the amount of energy delivered to a turbine. Further still, timing adjustments to valve operation are made in relation to crankshaft position. That is, if an exhaust cam is retarded 5 degrees, the 5 degrees are measured as 5 degrees of crankshaft, rotation.

Figure 3:
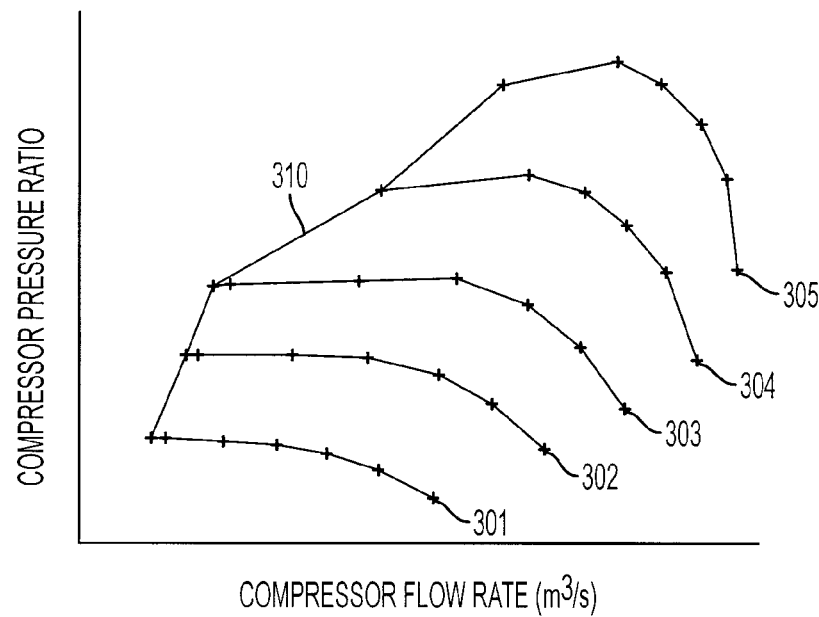
FIG. 3 is a plot that shows example compressor flow characteristics.

Referring now to FIG. 3, a plot of a turbocharger compressor map is shown. The Y-axis describes the pressure ratio across the turbocharger compressor. That is, the ratio created by dividing the compressor output pressure by the compressor inlet pressure. The X-axis describes the compressor flow rate. Curves 301-305 represent pressure ratio versus flow for different compressor speeds. Curve 310 can be stored in engine controller 12 memory and represents the compressor surge boundary where flow through the compressor degrades. Accordingly, operating the compressor in the region to the left of curve 310 is undesirable. If the compressor pressure ratio is driven toward the surge line, by a rapidly changing throttle plate position for example, the turbocharger's turbine waste gate or vane position can be adjusted along with valve timing/lift to mitigate the effects of operating in this region. In this way, the time that turbocharger operates in an undesirable condition may be reduced. In one embodiment, exhaust valve timing can be retarded to lower the volumetric efficiency of a cylinder bank and reduce cylinder follow to a turbine that is coupled to a compressor that is approaching a surge boundary. In another embodiment, intake valve timing of a cylinder bank can be retarded to reduce cylinder flow to a turbine that is coupled to a compressor that is approaching a surge boundary. In still another embodiment, intake valve timing of a cylinder bank can be advanced to reduce cylinder flow to a turbine that is coupled to a compressor that is approaching a surge boundary.

Figure 4:
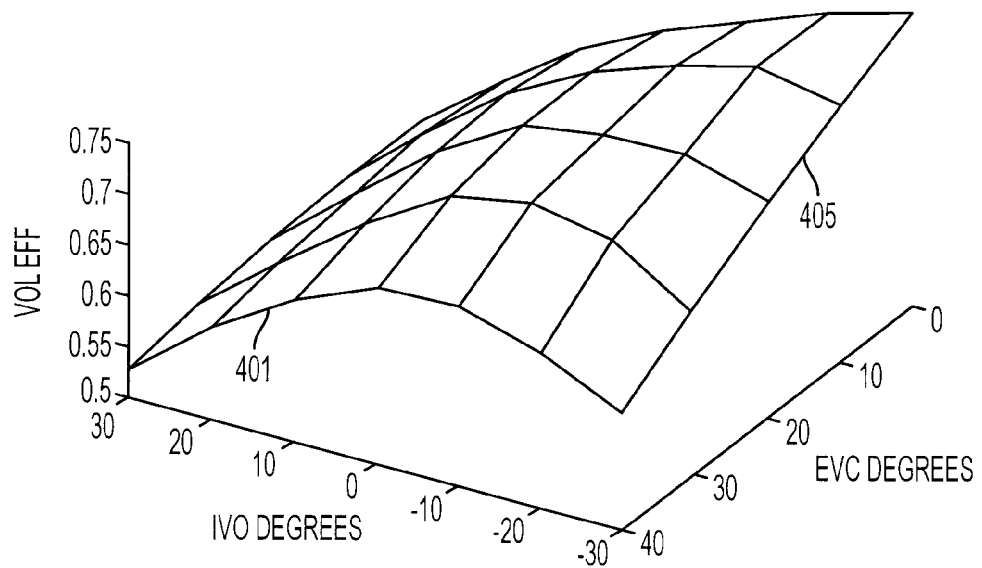
FIG. 4 is a plot that shows the relationship between intake and exhaust valve timing on engine volumetric efficiency.

Referring now to FIG. 4, a plot that describes the relationship between example engine valve timing and engine volumetric efficiency is shown. A surface is created for illustration purposes by linking together mapped engine operating points. The Y-axis represents engine volumetric efficiency (VOL EFF). Volumetric efficiency is defined here as the ratio of actual air pumped through the engine to the theoretical engine air pumping capacity. Efficiency is normalized between zero and one, where one is equal to 100% efficiency. The X-axis represents the IVO location (or timing) in degrees relative to TDC intake stroke (i.e., zero degrees). Numbers less than zero represent intake valve opening locations that are before TDC and numbers greater than zero represent intake valve opening locations that are after TDC. The Z-axis represents exhaust valve closing (EVC) location (or timing) in degrees relative to TDC. In this example, all exhaust valve closing times are shown retarded from TDC; however, exhaust valve closing times may be advanced from TDC if desired.

In curve 401, for example, volumetric efficiency decreases (i.e., less air is pumped through the engine) when IVO is advanced (moved to the right of TDC) or retarded from TDC. This curve represents the influence of IVO on engine volumetric efficiency when EVC is held constant at forty degrees. Advancing or retarding valve timings for other operating conditions similarly influences volumetric: efficiency, except that the location of higher volumetric (i.e., TDC in FIG. 401) varies with engine operating conditions.

The relationship between EVC and volumetric efficiency is illustrated by curve 405. Here, volumetric efficiency decreases as EVC is retarded from TDC.

Several observations can be made from the surface plot. Namely, depending on the initial valve timings, advancing intake valve timing at one condition will reduce engine volumetric efficiency while advancing valve timing from another condition will increase engine volumetric efficiency. Therefore, the decision of whether to advance or retard intake valve timing will depend on the initial intake valve timing and the desire to increase or decrease cylinder volumetric efficiency. The figure also shows that exhaust valve timing can be retarded to reduce engine volumetric efficiency and cylinder flow. By retarding the exhaust valve timing, more residual gas is trapped in the cylinder and the propensity for fresh air to be inducted into the cylinder is reduced.

Referring now to FIG. 5, a plot that illustrates the effect of variable exhaust valve timing on intake manifold pressure and cylinder air charge is shown. The data were generated from a naturally aspirated engine operating at 1500 RPM but turbocharged engines are expected to exhibit similar characteristics. The Y-axis represents intake manifold absolute pressure (MAP) in units of inches of mercury. The X-axis represents the engine airflow in grams per second. Line 501 represents the relationship between intake manifold pressure and engine airflow when the intake valve opens at 10 degrees before top-dead-center intake stroke and the exhaust valve closes at 40 degrees after top-dead-center intake stroke. Line 503 represents the relationship between intake manifold pressure and engine airflow when the intake valve opens at 10 degrees before top-dead-center intake stroke and the exhaust valve closes at 30 degrees after top-dead-center intake stroke. Line 505 represents the relationship between intake manifold pressure and engine airflow when the intake valve opens at 10 degrees before top-dead-center intake stroke and the exhaust valve closes at 20 degrees after top-dead-center intake stroke. Line 507 represents the relationship between intake manifold pressure and engine airflow when the intake valve opens at 10 degrees before top-dead-center intake stroke and the exhaust valve closes at top-dead-center intake stroke. Thus, the intake manifold pressure and full load cylinder air charge can be affected by the choice of exhaust valve timing. The figure also illustrates that intake manifold pressure can be readily determined given an engine airflow and a cam position, as is described in the explanation of FIG. 2.

Referring now to FIG. 6, a plot that illustrates the effect of variable intake valve timing on intake manifold pressure and cylinder air charge is shown. The data were generated at 1500 RPM. The Y-axis represents intake manifold absolute pressure (MAP) in units of inches of mercury. The X-axis represents the engine airflow in grams per second. Line 621 represents the relationship between intake manifold pressure and engine airflow when the intake valve opens at 30 degrees after top-dead-center intake stroke and the exhaust valve closes at 20 degrees after top-dead-center intake stroke. Line 623 represents the relationship between intake manifold pressure and engine airflow when the intake valve opens at 20 degrees after top-dead-center intake stroke and the exhaust valve closes at 20 degrees after top-dead-center intake stroke. Line 625 represents the relationship between intake manifold pressure and engine airflow when the intake valve opens at 30 degrees before top-dead-center intake stroke and the exhaust valve closes at 20 degrees after top-dead-center intake stroke. Line 627 represents the relationship between intake manifold pressure and engine airflow when the intake valve opens at top-dead-center intake stroke and the exhaust valve closes at 20 degrees after top-dead-center intake stroke. The several curves illustrate that a desired manifold pressure can be readily determined at different cam positions and engine speeds. This relationship can be used to advantage as is described in the explanation of FIG. 2.

As will be appreciated by one of ordinary skill in the art, the routines described in FIG. 2 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling an engine, comprising:
   balancing mass flow through first and second engine cylinder groups varying valve operation of cylinders in the second cylinder group as a waste gate position of a first turbocharger is adjusted, said first turbocharger located in an exhaust path of the first cylinder group, the mass flow through the second cylinder group directed to a second turbocharger.

2. The method of claim 1 further comprising varying valve operation of cylinders in the first cylinder group oppositely to the adjusting of the cylinders in the second cylinder group.

3. The method of claim 2 wherein the varying valve operation of cylinders in the first cylinder group and the varying valve operation of cylinders in the second cylinder group comprises advancing a cam timing of the first cylinder group cylinders to advance valve opening timing while retarding a cam timing of the second cylinder group cylinders to retard valve opening timing, the flow balanced by increasing flow of a compressor of the first turbocharger while decreasing flow of the second turbocharger and while maintaining an overall cylinder air flow substantially constant.

4. The method of claim 1 wherein a waste gate of said second turbocharger is in communication with said second cylinder group.

5. The method of claim 1 wherein varying valve operation of cylinders in the second cylinder group varies valve timing relative to a crankshaft.

6. The method of claim 1 wherein said valve operation is varied as an amount of exhaust residuals vary in said first cylinder group.

7. The method of claim 1 wherein said valve operation is varied by varying valve lift.

8. The method of claim 1 wherein varying said valve operation increases an amount of valve overlap between intake and exhaust valves of said cylinders.

9. The method of claim 1 further comprising adjusting a position of a throttle plate as said valve operation is varied.

10. The method of claim 1 wherein said valve operation is a timing of an exhaust valve relative to a crankshaft position.

11. The method of claim 1 wherein said valve operation is a timing of an intake valve relative to a crankshaft position.

12. A method for controlling an engine, comprising:
balancing mass flow through first and second engine cylinder groups varying valve operation of cylinders in the second cylinder group as a waste gate position of a first turbocharger is adjusted, said first turbocharger located in an exhaust path of the first cylinder group, the mass flow through the second cylinder group directed to a second turbocharger; while
varying a throttle position upstream of both cylinder groups.

13. The method of claim 12 further comprising varying valve operation of cylinders in the first cylinder group oppositely to the adjusting of the cylinders in the second cylinder group.

14. The method of claim 13 wherein the varying valve operation of cylinders in the first cylinder group and the varying valve operation of cylinders in the second cylinder group comprises advancing a cam timing of the first cylinder group cylinders to advance valve opening timing while retarding a cam timing of the second cylinder group cylinders to retard valve opening timing, the flow balanced by increasing flow of a compressor of the first turbocharger while decreasing flow of the second turbocharger and while maintaining an overall cylinder air flow substantially constant.

15. The method of claim 12 wherein a waste gate of said second turbocharger is in communication with said second cylinder group.

16. The method of claim 12 wherein varying valve operation of cylinders in the second cylinder group varies valve timing relative to a crankshaft.

17. A method for controlling a V-engine with first and second cylinder banks, comprising:
during exhaust backpressure differences between the banks, varying valve operation of cylinders in the second bank as a waste gate position of a first turbocharger is adjusted, said first turbocharger having a turbine located in an exhaust of the first bank and a second turbocharger having a turbine located in an exhaust of the second bank; while
varying position of a throttle.

18. The method of claim 17 further comprising adjusting spark in said second bank of cylinders as said valve operation is varied in said second bank.

19. The method of claim 17 wherein varying valve operation includes varying intake valve timing relative to a crankshaft of the engine.

20. The method of claim 17 wherein varying valve operation includes varying exhaust valve timing relative to a crankshaft of the engine.

* * * * *